July 7, 1942. W. J. WHITEHEAD ET AL 2,288,864
MEANS FOR HOLDING PARTS TOGETHER
Filed Aug. 8, 1941
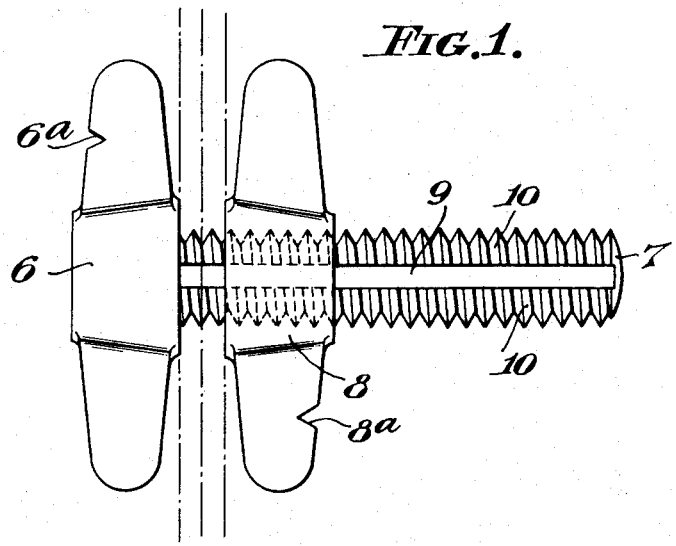
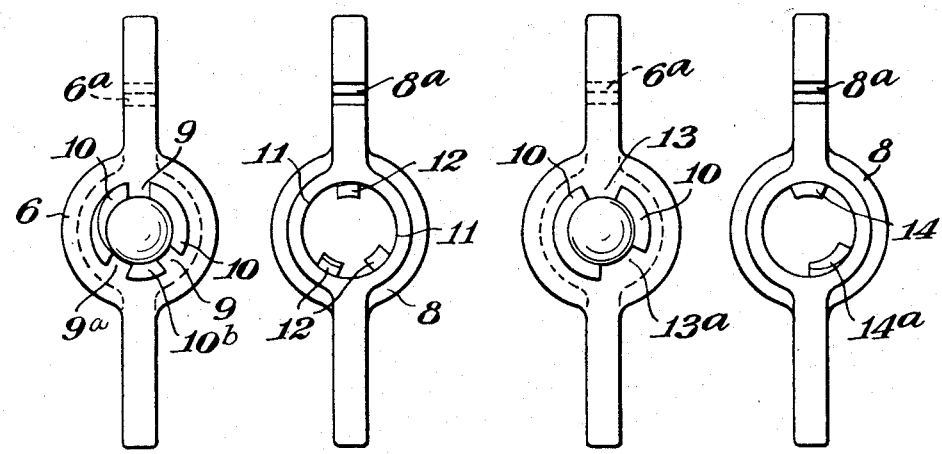
INVENTORS
WALTER J. WHITEHEAD
CECIL S. WHITEHEAD
By Wachaufter Groff Attys Patented July 7, 1942

2,288,864

UNITED STATES PATENT OFFICE 2,288,864

MEANS FOR HOLDING PARTS TOGETHER

Walter John Whitehead and Cecil Stanley Whitehead, Rochester, England

Application August 8, 1941, Serial No. 406,060
In Great Britain December 3, 1940

5 Claims. (Cl. 85—1)

This invention has reference to improvements in fixing means, and has for its primary object to provide a means which can be utilised for temporarily holding together parts or elements while the said parts or elements are being treated or fixed together permanently. It is the usual practice to hold said parts by nuts and bolts and this practice occupies much time and labour in screwing up and unscrewing the nut and bolt means.

A further object is to provide a means which can also be utilised for the said purpose but which also can be connected together in the ordinary screw and nut method.

A still further object is to provide a means whereby the nut can be slid up the bolt shank and then given almost a complete revolution before the threads disengage.

Another object is to provide connecting means which are applicable to a multitude of purposes where nut and bolt connecting means are employed such as for terminals and the like.

With these are other objects which will be apparent from the following specification, reference will now be made to the accompanying sheet of drawing which illustrates two preferred forms of the invention wherein:

Figure 1 is a plan view of one form of the invention with the nut element partly engaged, Figure 2 is an end view of the bolt from the direction of the shank, Figure 3 is a similar view of the nut, and Figures 4 and 5 are views similar to Figures 2 and 3 of an alternative form.

In the drawing the means are in the form of a bolt having a wing head 6 and shank portion 7 and a wing nut 8, which are particularly intended for temporarily holding together plates or like members. The bolt is provided with three slots therein, namely the main slot 9 and the secondary slots 9a and 9b which, as will be observed, are unequally spaced or diametrically disaligned leaving three threaded portions 10. The slots are cut to substantially the same depth as the thread which is of a pitch which in practice will result in an easy lead and adequate movement to ensure the tightening of the members. The wing nut 8 is cut away at 11 leaving three projections 12 which are threaded on their inner face. These projections have the same angular relation as the slots 9, 9a and 9b.

The bolt head 6 is provided with a nick 6a therein and the wing nut 8 is provided with a similar nick 8a. This allows for the bolt to be inserted with the head in one direction e. g. with the nick uppermost so that the nut can be slid on quickly if its nick is similarly disposed.

It will be observed that the nut, when in the correct position, can be slid along the shank until it contacts the adjacent plate, when the tightening of the nut will result in the clamping up of the parts. Further, owing to the spacing of the gaps, if the nut is placed on the other way round, at no position through a revolution will all the gaps and recesses align so that an ordinary nut and bolt construction is obtained.

Referring now to the arrangement shown in Figures 4 and 5, in this case two longitudinal gaps 13, 13a are provided on the shank 7 leaving the two threaded portions 10. The main gap 13 is of a width slightly less than the width of the gap 13a and the said gaps may be offset slightly with respect to the diameter. The nut is provided with two threaded projections 14, 14a so that its interior corresponds with the cross section of the shank.

In this case also, almost a complete revolution can be effected before the nut and shank become unlocked, and further by reversing the nut, the threads will grip for the complete revolution.

The invention may also be applied in cases where the nut and bolt or the like secure parts together or to a main member, e. g. terminals for wireless sets and the like.

We claim:

1. A means for holding parts together comprising a headed screw member, a shank portion on said member, a plurality of diametrically disaligned longitudinal slots of different widths in said shank portion and a locking member consisting of a nut, a plurality of inward screw threaded projections in said aperture of the same number and dimensioned and positioned so as to be complementary with the slots in the shank portion and allow the nut to slide up the shank in one position when placed one way round until the parts are held and locked by part turning the locking member, and when placed the other way round to act as an ordinary nut and bolt connection.

2. A means for holding parts together comprising a headed screw member, a shank portion on said member, three longitudinal slots of unequal angular disposition on the shank and equal width and a locking member consisting of a nut, a plurality of inward screw threaded projections in said aperture of the same number and dimensioned and positioned so as to be complementary with the slots in the shank portion and allow the nut to slide up the shank in one position when placed one way round until the parts are held and locked by part turning the locking member, and when placed the other way round to act as an ordinary nut and bolt connection.

3. A means for holding parts together comprising a headed screw member, a shank portion on said member, two diametrically disaligned longitudinal slots of the same depth but of unequal widths, in said shank portion and a locking member consisting of a nut, a plurality of inward screw threaded projections in said aperture of the same number and dimensioned and positioned so as to be complementary with the slots in the shank portion and allow the nut to slide up the shank in one position when placed one way round until the parts are held and locked by part turning the locking member, and when placed the other way round to act as an ordinary nut and bolt connection.

4. A setting up bolt or the like, comprising, a headed member having a screw shank provided with a longitudinally extending main slot, a secondary slot also extending longitudinally of the threaded shank and diametrically disaligned with said main slot, an apertured nut having inwardly extending threaded projections within the aperture and of the same number and angular disposition as the slots in the shank portion to register therewith and permit the nut to advance along the threaded shank to a selected point at which rotational movement of the nut relative to the threaded shank will cause the threaded projections to engage with the thread sections of the shank, said apertured nut when reversed end for end with respect to the shank having the threaded projections thereof disaligned with said slots thereby to cause the nut and shank to act as an ordinary nut and bolt connection.

5. A setting up bolt or the like, comprising, a headed member having a screw shank provided with a longitudinally extending main slot, a plurality of secondary slots also extending longitudinally of the threaded shank and each diametrically disaligned with said main slot, an apertured nut having inwardly extending threaded projections within the aperture and of the same number and angular disposition as the slots in the shank portion to register therewith and permit the nut to advance along the threaded shank to a selected point at which rotational movement of the nut relative to the threaded shank will cause the threaded projections to engage with the thread sections of the shank, said apertured nut when reversed end for end with respect to the shank having the threaded projections thereof disaligned with said slots thereby to cause the nut and shank to act as an ordinary nut and bolt connection.

WALTER JOHN WHITEHEAD.
CECIL STANLEY WHITEHEAD.